United States Patent
Bauerle et al.

(10) Patent No.: US 7,533,322 B2
(45) Date of Patent: May 12, 2009

(54) METHOD AND SYSTEM FOR PERFORMING FUNCTION-SPECIFIC MEMORY CHECKS WITHIN A VEHICLE-BASED CONTROL SYSTEM

(75) Inventors: Paul A. Bauerle, Fenton, MI (US); Kerfegar K. Katrak, Fenton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 566 days.

(21) Appl. No.: 11/266,609

(22) Filed: Nov. 3, 2005

(65) Prior Publication Data

US 2007/0101236 A1 May 3, 2007

(51) Int. Cl.
*G11C 29/00* (2006.01)
(52) U.S. Cl. .............................. 714/763; 701/1; 710/35
(58) Field of Classification Search .................. 714/763
See application file for complete search history.

(56) References Cited

U.S. PATENT DOCUMENTS

| | | | | |
|---|---|---|---|---|
| 5,513,107 A | * | 4/1996 | Gormley | 701/48 |
| 5,884,211 A | * | 3/1999 | Pauli et al. | 701/115 |
| 7,349,776 B2 | * | 3/2008 | Spillane et al. | 701/36 |
| 2004/0088087 A1 | * | 5/2004 | Fukushima et al. | 701/32 |
| 2005/0033493 A1 | * | 2/2005 | Eguchi et al. | 701/36 |
| 2007/0078600 A1 | * | 4/2007 | Fregene et al. | 701/301 |

* cited by examiner

*Primary Examiner*—Esaw T Abraham
*Assistant Examiner*—Enam Ahmed

(57) ABSTRACT

Integrity of data stored in a memory space associated with a vehicle-based control system (such as a traction enhancement system) is verified through the use of sub-module checksums. A checksum for one or more subsystem modules is initially calculated based upon a checksum routine and the values of data residing in the portions of the memory space associated with the subsystem of interest. A global checksum is also initially calculated based upon data associated with the entire memory space. If the global checksum matches an expected value, the subsystem checksum(s) are stored as expected subsystem checksums. During subsequent operation, a second subsystem checksum is calculated and compared against the expected checksum value for the subsystem to verify the integrity of data residing within the memory space associated with the subsystem.

20 Claims, 2 Drawing Sheets

METHOD AND SYSTEM FOR PERFORMING FUNCTION-SPECIFIC MEMORY CHECKS WITHIN A VEHICLE-BASED CONTROL SYSTEM

TECHNICAL FIELD

The present invention generally relates to control systems found on automobiles and other vehicles, and more particularly relates to methods and systems for performing function-specific memory checks within a vehicle-based control system.

BACKGROUND

Modern automobiles and other vehicles commonly include sophisticated on-board computer systems that monitor the status and performance of various components of the vehicle (e.g., engine, transmission, brakes, suspension, etc.). Many of these computer systems also adjust or control one or more operating parameters of the vehicle in response to operator instructions, road or weather conditions, operating status of the vehicle, and/or other factors.

Various types of microcontroller or microprocessor-based controllers found on many conventional vehicles include supervisory control modules (SCMs), engine control modules (ECMs), controllers for various vehicle components (e.g., anti-lock brakes, electronically-controlled transmissions, etc.), and/or the like. Such controllers are typically implemented with any type of microprocessor, microcontroller or other control device that appropriately receives data from one or more sensors or other sources, processes the data to create suitable output signals, and provides the output signals to control actuators, dashboard indicators and/or other data responders as appropriate. The various components of a vehicle-based control system typically inter-communicate with each other and/or with sensors, actuators and the like across any type of serial and/or parallel data links. Nowadays, data processing components within a vehicle are commonly interlinked by a data communications network such as a controller area network (CAN), an example of which is described in ISO Standard 11898-1 (2003).

Because vehicles now process relatively large amounts of digital data during operation, it can be an engineering challenge to ensure that the data processed is accurate and reliable. As digital data is stored, processed, consumed and/or shared between or within the various data processing components of a vehicle, for example, bit errors and the like can occur due to environmental factors, hardware faults and other causes. As a result, various techniques have been developed to ensure the integrity of data processed within the vehicle. In a vehicle stability enhancement system, for example, the memory space associated with one or processors is typically checked during operation to ensure the absence of bit errors or other issues that could indicate the presence of unreliable data. Scanning the entire system memory, however, can be time consuming, particularly while the system is in operation. Additionally, while a scan of the entire system memory space can be very effective at identifying the presence of unreliable data, such checks are typically incapable of isolating the particular data that may be suspect. As a result, the entire system may be treated as suspect until the particular data at issue can be identified.

It is therefore desirable to formulate an error detection technique suitable for use in a vehicle traction control system that is capable of rapidly identifying errors within a particular data processing module or sub-module. Moreover, it is desirable to create a technique that assists in isolating suspect data. Furthermore, other desirable features and characteristics will become apparent from the subsequent detailed description and the appended claims, taken in conjunction with the accompanying drawings and the foregoing technical field and background.

BRIEF SUMMARY

According to various exemplary embodiments, a method for verifying the integrity of data stored in a memory space associated with a vehicle-based control system (such as a traction enhancement system) is verified through the use of sub-module checksums. A checksum for one or more sub-system modules is initially calculated with an appropriate checksum routine using input values based upon the data residing in the portions of the memory space associated with the subsystem of interest. A global checksum is also initially calculated based upon data associated with the entire memory space. If the global checksum matches an expected value, the integrity of the memory space as a whole is deemed acceptable, and the subsystem checksum(s) are stored as expected subsystem checksums. During subsequent operation, a second subsystem checksum is calculated and compared against the expected checksum value for the subsystem to verify the integrity of data residing within the memory space associated with the subsystem. Similar concepts may be applied to any number of sub-system checksums.

In various further embodiments, a control system for a vehicle suitably comprises a subsystem means configured to execute within a portion of a memory space associated with the control system, as well as various means for verifying the integrity of data contained within the portion of the memory space.

In still other embodiments, a traction enhancement system for a vehicle is provided that comprises a digital memory and a controller. The digital memory includes a plurality of portions associated with each of a plurality of subsystem processing modules, including a steering subsystem module, a braking subsystem module and a suspension subsystem module. The controller is configured in data communication with the digital memory to execute a traction enhancement program that includes features for verifying the integrity of data stored within the digital memory space.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

According to various exemplary embodiments, a control system operating within an automobile, truck or other vehicle suitably includes various computing sub-systems executing as modules within a memory space associated with one or more controller devices. As noted above, conventional memory verification techniques typically evaluated the entire memory space to identify any data faults existing therein. To avoid the lengthy processing times associated with such verification while the control system is in operation, a sub-system checksum is computed for only the portion of the memory space associated with the sub-module of interest. The sub-system checksum is typically computed at a time when the system can be readily verified to be stable (e.g., at system startup), and the resulting value is stored for subsequent reference as an expected value of the checksum. If subsequent checksum computations performed on the same memory region using the same checksum technique result in the expected value, the portion of the memory space associated with the sub-system can be assumed to be reliable. Because one or more sub-systems can be verified without requiring a complete check of the entire memory space, the processing time and overhead may be significantly reduced. Moreover, if a fault does occur, the sub-system or routine containing the fault is readily identified, thereby allowing for fail-safe, fail-soft and/or recovery techniques to be implemented on the module or routine of interest. Additionally, checksums associated with the various sub-systems can be computed according to any technique, thereby allowing different subsystem routines to be applied to different subsystems. Modules that require significant levels of data security can therefore be evaluated using a more advanced checksum routine, while other modules that are less data critical can be evaluated using more computationally-efficient techniques.

Figure 1:
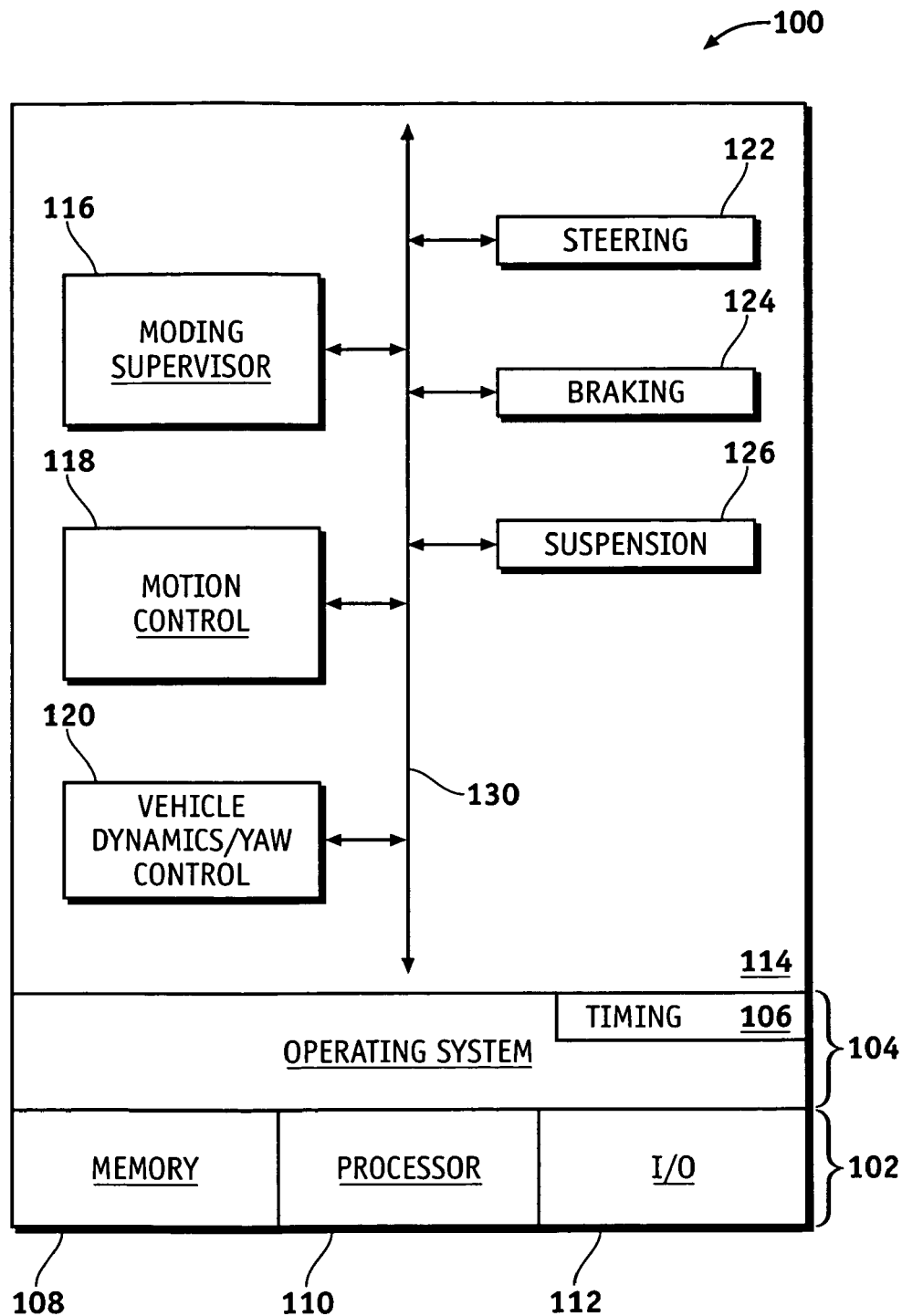
FIG. 1 is a block diagram of an exemplary computing system that includes various processing modules.

Turning now to the drawing figures and with initial reference to FIG. 1, an exemplary control system 100 suitably includes any number of sub-system modules 116-126 residing within a secure memory space 114 associated with a microprocessor or other control device 110. Although the concepts set forth herein are frequently described with reference to a traction enhancement system operating within a single supervisory control module (SCM) in a vehicle, the scope of the invention is much broader. Indeed, the concepts described herein could be equivalently applied to any control or other data processing system operating within a vehicle environment that incorporates any number or type of processors or controllers. Some or all of the various sub-modules could physically reside on separate hardware devices, for example, and yet remain part of the same logical system 100.

System 100 suitably includes any processor 110, input/output circuitry 112 and memory 108 in addition to any other conventional data processing resources commonly found in a data processing environment. In various embodiments, controller 110 is implemented within one or more microcontroller devices configured as a vehicle supervisory control module (SCM). Such devices typically include an onboard microprocessor 110 as well as memory 108 and I/O 112 on a common board or other substrate. Alternatively, memory 108 may be any random access, flash, read-only or other digital memory that is configured in communication with one or more processors 10 in any manner, and/or as any magnetic, optical or other storage medium.

Controller 110 generally executes an operating system 104 that provides conventional services that allow processor 110 to obtain input data, to process the data as appropriate, and to provide suitable output data. Typically, operating system 104 is a multi-threaded operating system that allows multiple processes residing within memory space 114 to share access to processor 110. Such access sharing may be time-based (e.g., time domain multiplexing), interrupt-driven or otherwise implemented in any manner. In various embodiments, operating system 104 includes a timing module 106 that generates clock signals, issues and/or processes interrupts, or otherwise maintains the timing functions of operating system 104 as appropriate.

Memory space 114 is any secure region of memory 108 and/or another data storage device that is capable of storing one or more sub-system modules 116-126 executing within system 100. Although memory space 114 encompasses the some or all of memory 108 in various embodiments, memory space 114 is intended as a logical representation of the data storage region intended to be maintained free of data faults. References to the "substantial entirety" or "substantial totality" of memory space 114, then, are intended to encompass the portion of physical memory and/or other data storage available to control system 100 that are verified for data faults, recognizing that this portion may not encompass the entire memory space that is available to system 100. Stated another way, system 100 may in practice include both secure memory space 114 and additional memory space that is not verified as part of the same process described with respect to space 114.

Sub-systems 116-126 are any programming routines, processes, threads, applications, applets, controls, routines, daemons and/or other modules capable of performing computing tasks within system 100. Each sub-system suitably operates within the confines of operating system 104, which appropriately handles interactions between modules and with processor 110. In various embodiments, operating system 104 further allows for communications 130 between two or more modules 116-126 in any manner. The particular sub-modules 116-126 residing within secure memory space 114 will vary widely from embodiment to embodiment of system 100. Certain systems 100 will contain as few as one sub-module operating within secure space 114, for example, or as many as dozens, hundreds or more modules. Similarly, the types of sub-systems 116-126 found in particular embodiments may vary, as may the ability of various sub-systems to communicate with each other. With a simple vehicle-based control setting, for example, alternate embodiments may incorporate additional sub-modules for roll control, adaptive cruise control, torque control, and/or any other functions. The various sub-modules 116-126 may be similarly combined or rearranged in any manner.

In the exemplary embodiment shown in FIG. 1, the various sub-modules 116-126 include a moding supervisor 116, a motion control supervisor 118 and a vehicle dynamics/yaw control supervisor 120 that may be used to implement a traction enhancement system or the like. In operation, moding supervisor 116 places control system 100 into a desired operating mode based upon operator inputs, sensor data and/or other factors. Motion control supervisor 118 and vehicle dynamics supervisor 120 additionally process data to implement the various tasks associated with a control system as appropriate. In various embodiments, one or more supervisor modules 116, 118, 120 intercommunicate with various component modules (e.g., steering sub-module 122, braking sub-module 124, suspension sub-module 126 and/or the like). In a traction enhancement system, for example, vehicle dynamics supervisor 120 may be placed into an operating mode (e.g., in response to data received from moding supervisor 116) that adjusts vehicle operating parameters in response to environmental conditions, driver preferences, and/or other factors. To create a more exciting experience for the driver, for example, vehicle dynamics supervisor 120 may be placed into a "sport" mode that results in a tighter steering parameter set by steering module 122, a tighter suspension parameter setting in module 126, and/or the like. An example of a traction enhancement system is the STABILITRAK system available from General Motors Corp. of Detroit, Mich.

In operation, then, operating system 104 suitably supports various sub-systems 116-126 residing within secure memory space 114. To validate the data integrity of memory space 114 (and thereby ensure that data faults do not exceed an unacceptable level), operating system 104 and/or a control application operating within system 100 historically computed a checksum or other value derived from the contents of memory space 114 that could be checked against another checksum computed at a later time. If the checksum changed from its expected value over time, the change could be determined to result from one or more faults occurring within system 100. The time spent in verifying the relevant portions of memory space 114 can be reduced, however, by computing checksums on the basis of individual sub-systems 116-126 instead of the entire memory space 114. "Checksum" as used herein is intended to broadly encompass any computed value that is dependent upon the contents of a memory region or other data storage space. Examples of checksums include, without limitation, message digests, cyclic redundancy codes (e.g. CRC8, CRC16, CRC32 codes), parity codes, or other values computed according to any technique. Examples of checksum algorithms include the well-known MD2, MD4, MD5, SHA-3 and MarchC algorithms, as well as many others. Checksums are typically computed for any portion of any random access memory (RAM), read-only memory (ROM), flash memory, calibration RAM or the like, and may be optionally determined as part of any fault-detection process applied by or to system 100. Examples of fault detection processes include, without limitation, fault tree analysis, hazard analysis, design failure mode and effects analysis (DFMEA), and/or the like.

Figure 2:
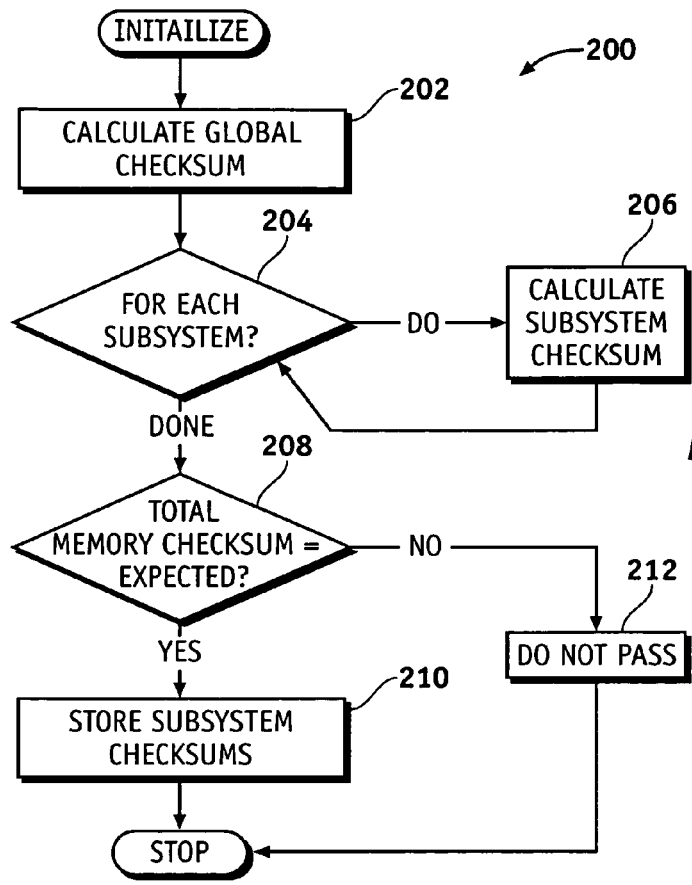
FIG. 2 is a flowchart of an exemplary process for creating checksum data for the various processing sub-systems.
Figure 3:
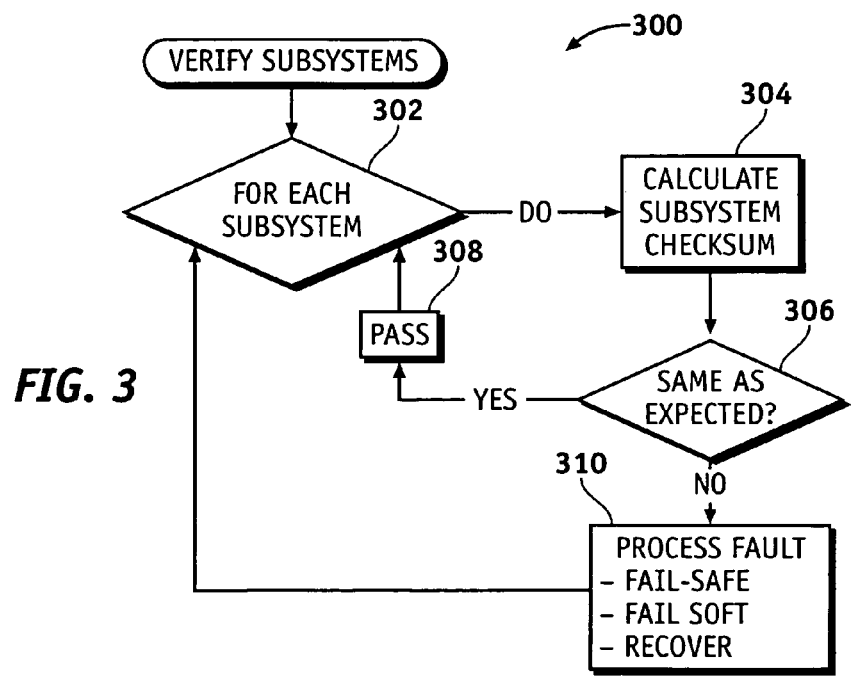
FIG. 3 is a flowchart of an exemplary process for verifying the data integrity of a portion of memory space associated with one or more submodules.

FIGS. 2 and 3 are flowcharts of exemplary processes 200, 300 that can be used to compute checksums on a relatively fast sub-system basis rather than a "global" basis that encompasses the entirety of memory space 114. Processes 200, 300 may be implemented as part of operating system 104 and/or as part of a control application operating within system 100. The various processing routines 200, 300 may be implemented using any software, hardware or hybrid technique, or using any programming or scripting language. The computer-executable instructions that carry out the various tasks shown in processes 200, 300 may be stored in source code, object code, and/or any other form on any diskette, compact disk (e.g., CD-ROM), memory device (including any RAM, ROM, FLASH or other memory), optical or magnetic storage medium (e.g., a hard disk drive), or other digital storage media. The particular modules and process steps shown in FIGS. 2-3 are intended as logical representations of exemplary steps that could be carried out in one embodiment, and not necessarily as literal interpretations of software code used to implement the concepts described.

Turning now to FIG. 2, an exemplary process for obtaining sub-module checksums suitably includes the broad steps of initially calculating a global checksum for the substantial totality of memory space 114 (step 202) and for one or more sub-systems 116-126 (steps 204, 206). If the global memory checksum is equal to an expected value (step 208), memory space 114 is verified to be in an acceptable state, and the calculated sub-system checksums are stored for subsequent use (step 210). The temporal order of the various steps may vary from that shown in FIG. 2 in various alternate embodiments. Steps 204 and 206, for example, may be performed after the global checksum is successfully verified (step 208) to reduce computation in the event of unsuccessful verification. Alternatively, the order of steps 202 and steps 204/206 shown in FIG. 2 may be reversed to allow the sub-module checksums to be considered in determining the global checksum. That is, the global checksum may be computed as a function of two or more sub-module checksums to create a single checksum indicative of a larger portion of memory space 114. This technique may be particularly useful in certain embodiments involving read-only memory, for example. Other temporal modifications could be applied to the exemplary process shown in FIG. 2 as appropriate.

Process 200 may take place at any time and at any frequency to ensure the data integrity of memory space 114 and/or any components residing therein. To ensure that memory space 114 is in a suitable state for computing sub-module checksums, a global checksum for memory space 114 is calculated in any manner (step 202). In various embodiments, the global checksum is calculated shortly following system startup and/or at another time in which the system is expected to be in a relatively reliable state. The checksum may be computed according to any technique, including any digest, CRC or similar algorithm. The "global" checksum is intended to provide a representation of the data state of a secure memory region 114, and may not encompass areas of memory 108 and/or other memory space available in system 100 that are not part of a secure space or another space of interest 114, as described more fully above.

Subsystem checksums are calculated for one or more sub-systems residing within the secure memory space 114 (steps 204, 206). In various embodiments, checksums are computed using any appropriate algorithms or methods using data residing in a portion of memory 114 that is associated with one or more sub-modules 116-126. The submodule checksum therefore provides a repeatable indication of the state of a portion of memory 114, thereby allowing subsequent verification that that portion of memory has not undesirably changed. Checksums are computed for each portion of memory that is to be independently verified during subsequent operation. In various embodiments, only one or two subsystems are verified using their own checksums, with the remaining modules portions of memory space 114 being verified during intermittent global checksum verification and/or another technique. Alternatively, most or all of sub-systems 116-126 are independently verified with their own sub-system checksum. Two or more sub-system checksums may be computed using a common checksum technique, or different checksum techniques may be used for different sub-modules. This flexibility allows for increased security to be applied to certain modules with more sensitive data, while allowing more computationally-efficient techniques to be used on memory regions that are less sensitive. In an exemplary traction enhancement system, for example, a relatively simple scheme could be used for suspension subsystem 126, with more advanced (e.g., CRC8 or CRC16) techniques used for braking data 124, and March C or another more-advanced technique used for steering data 122, vehicle dynamics data 120, or the like. The particular routines and parameters applied to various sub-systems may vary significantly from embodiment to embodiment.

At any time following computation of the global checksum, the global checksum is compared to an expected value (step 208) to ensure the data integrity of memory space 114. The expected value may be programmed in flash memory or other data storage accessible to system 100, and may correspond to any reliable indication that memory space 114 does not contain unacceptable data faults. The expected value may be programmed by the manufacturer, for example, or may be retained in memory from a previous checksum computation at a time that memory space 114 was known or reasonably believed to be in a reliable state. If the computed global checksum matches the expected value, then memory space 114 can be shown to be in a reliable state, thereby permitting subsequent use of subsystem checksums calculated at this time. The subsystem checksum(s) are then stored as expected values that can be used during subsequent checksum tests. Expected subsystem checksum values may be stored within memory 108 and/or any other storage space available to system 100.

With reference now to FIG. 3, an exemplary process 300 for verifying one or more subsystems 116-126 suitably includes the broad steps of calculating a subsequent checksum for the subsystem(s) of interest (steps 302, 304), comparing the subsequently-determined values to the expected values previously stored (step 306), and processing a successful or unsuccessful result (steps 308 and 310, respectively).

As noted above, subsequent checksum computation may be performed for only one of the sub-systems or for any combination of subsystems as appropriate, using the checksum technique used to compute the expected value for the particular sub-system 116-126. Subsequent verification may take place on any temporal basis (e.g., a periodic or a periodic basis, an interrupt driven basis, a basis dictated by external testing constraints, and/or any other basis). Although the literal logic of the flowchart shown in FIG. 3 shows all of the submodules being verified as part of a FOR-NEXT looping structure, it is not necessary to verify multiple subsystems within a common process. That is, one or more sub-systems may be verified independently of the other sub-modules.

In the event that the subsequently-computed checksum does not match the expected checksum value previously stored for one or more sub-systems, the identified fault may be processed in any manner (step 306). In many embodiments, a "fail-safe" strategy simply disables some or all of system 100 to prevent the fault from propagating through the system and/or creating other undesirable results. In more advanced "fail-soft" systems, critical failures may result in some or all of the offending sub-system being disabled and/or a reduction in system functionality, but with continued operation of non-threatened portions of system 100. Because data faults can be identified on a sub-system basis rather than on the basis of the entire memory space 114, fail soft techniques can be used to limit the effects of data faults that are encountered. If a fault is identified within a suspension module 126, for example, fail-soft techniques may simply disable further suspension adjustments, but allow other features of system 100 to continue.

In still further embodiments, function based analysis can be used to diagnose and/or treat faults that are identified within a sub-system. Faults can be identified and/or eliminated using conventional data recovery techniques. Additionally, various embodiments modify parameters of other subsystems to reduce the effects of any data faults identified within a module. In a traction enhancement system, for example, undesired impacts upon a suspension sub-systems 126 could be compensated through regenerative braking, engine or torque braking, steering, and the like. Again, because the source of the fault is at least somewhat localized within memory space 114, there is no need to shut down the entire system 100 for many faults, and indeed the effects of certain data faults can be reduced or eliminated through reconfiguration of other parameters within system 100.

While at least one exemplary embodiment has been presented in the foregoing detailed description, a vast number of variations exist. The exemplary embodiments described herein are intended only as examples, and are not intended to limit the scope, applicability, or configuration of the invention in any way. Rather, the foregoing detailed description will provide those skilled in the art with a convenient road map for implementing one or more exemplary embodiments. Various changes can therefore be made in the functions and arrangements of elements set forth herein without departing from the scope of the invention as set forth in the appended claims and the legal equivalents thereof.

What is claimed is:

1. A method for rapidly verifying the data integrity of a subsystem operating within a memory space associated with a vehicle-based control system, the method comprising the steps of:

initially calculating a subsystem checksum and a global checksum, wherein the subsystem checksum is calculated using a checksum routine based upon data residing in a portion of the memory space associated with the subsystem, and wherein the global checksum is calculated based upon data associated with a substantial totality of the memory space;

If the global checksum matches an expected value, storing the subsystem checksum as an expected subsystem checksum and, if the global checksum does not match the expected value, not storing the subsystem checksum as the expected subsystem checksum; and Subsequently verifying that a second subsystem checksum calculated using the checksum routine based upon the data residing in the portion of the memory space associated with the subsystem matches the expected subsystem checksum.

2. The method of claim 1 wherein the subsystem is one of a plurality of subsystems residing within the memory space.

3. The method of claim 2 wherein each of the plurality of subsystem checksums is computed according to a common checksum routine.

4. The method of claim 2 wherein at least a first one of the plurality of subsystem checksums is computed according to a first checksum routine, and wherein a second one of the plurality of subsystem checksums is computed according to a second checksum routine different from the first checksum routine.

5. The method of claim 2 wherein the calculating step comprises calculating a plurality of subsystem checksums, wherein each of the plurality of subsystem checksums is associated with one of the plurality of subsystems.

6. The method of claim 5 wherein the storing step comprises storing each of the plurality of subsystem checksums as a plurality of expected subsystem checksums if the global checksum matches the expected value.

7. The method of claim 6 wherein the verifying step comprises subsequently verifying that each of a plurality of second subsystem checksums match the expected subsystem checksums for at least two of the plurality of subsystems.

8. The method of claim 2 further comprising the step of identifying a fault occurring within the portion of the memory associated with at least one of the plurality of subsystems.

9. The method of claim 8 further comprising the step of adjusting a parameter associated with a second subsystem to compensate for the fault.

10. The method of claim 2 wherein the plurality of subsystems comprises a moding supervisor module, a motion control supervisor module, and a vehicle dynamics/yaw control supervisor.

11. The method of claim 10 wherein the plurality of subsystems further comprises a steering subsystem, a braking subsystem and a suspension subsystem.

12. The method of claim 1 further comprising the step of disabling the subsystem if the second subsystem checksum does not match the expected subsystem checksum.

13. The method of claim 1 further comprising the step of identifying a fault occurring within the portion of the memory associated with the subsystem if the second subsystem checksum does not match the expected subsystem checksum.

14. The method of claim 13 further comprising the step of adjusting the performance of the subsystem in response to the fault.

15. The method of claim 13 further comprising the step of repairing the fault.

16. A digital storage medium having computer-executable instructions stored thereon configured to execute the method of claim 1.

17. A control system for a vehicle, the system comprising:
a memory having a memory space associated with the control system;
subsystem means configured to execute within a portion of the memory space; and
a controller comprising:
means for calculating an initial subsystem checksum and a global checksum, wherein the initial subsystem checksum is calculated using a checksum routine based upon data residing in the portion of the memory space associated with the subsystem module, and wherein the global checksum is calculated based upon data associated with a substantial totality of the memory space;
means for storing the initial subsystem checksum, wherein the initial subsystem checksum is stored as an expected subsystem checksum if the global checksum matches an expected value and, if the global checksum does not match the expected value, the subsystem checksum is not stored as the expected subsystem checksum; and
means for subsequently verifying that a second subsystem checksum calculated using the checksum routine based upon the data residing in the portion of the memory space associated with the subsystem module matches the expected subsystem checksum.

18. The system of claim 17 wherein the subsystem means is one of a plurality of subsystem means each configured to execute within the memory space, and wherein the plurality of subsystem means comprises a steering subsystem, a braking subsystem and a suspension subsystem, and wherein the system is a traction enhancement system.

19. A traction enhancement system for a vehicle, the system comprising:
a digital memory having a plurality of portions associated with each of a plurality of subsystem processing modules, the plurality of subsystem processing modules comprising a steering subsystem module, a braking subsystem module and a suspension subsystem module; and;
a controller in data communication with the digital memory configured to execute a traction enhancement program, wherein the traction enhancement program is configured at least in part to initially calculate a plurality of subsystem checksums and a global checksum, wherein each of the subsystem checksums is calculated based upon data residing in the portion of the memory space associated with one of the subsystem modules, and wherein the global checksum is calculated based upon data associated with a substantial totality of the memory space, and wherein the controller is further configured to store each of the subsystem checksums in the digital memory if the global checksum matches an expected value, to not store the subsystem checksums if the global checksum does not match the expected value, and to process a fault condition if the subsystem checksum for at least one subsystem module differs from a second subsystem checksum subsequently calculated based upon the data residing in the portion of the memory space associated with the at least one subsystem module.

20. The system of claim 19 wherein the controller is further configured to compute the subsystem checksum for a first one of the plurality of subsystems according to a first checksum routine, and to compute the subsystem checksum for a second one of the plurality of subsystems according to a second checksum routine that is different from the first checksum routine.

* * * * *